United States Patent
Miki

(10) Patent No.: US 7,319,489 B2
(45) Date of Patent: Jan. 15, 2008

(54) CAMERA WITH STROBE LIGHT

(75) Inventor: Shigeru Miki, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 754 days.

(21) Appl. No.: 10/446,224

(22) Filed: May 28, 2003

(65) Prior Publication Data

US 2003/0223011 A1 Dec. 4, 2003

(30) Foreign Application Priority Data

May 31, 2002 (JP) ............... 2002-159670

(51) Int. Cl.
*H04N 5/222* (2006.01)
(52) U.S. Cl. ...................... 348/371; 348/370
(58) Field of Classification Search ............... 348/371, 348/370; 362/5, 4
See application file for complete search history.

(56) References Cited

U.S. PATENT DOCUMENTS

| | | | |
|---|---|---|---|
| 5,410,225 A * | 4/1995 | Ishii et al. ............... | 348/229.1 |
| 6,151,073 A * | 11/2000 | Steinberg et al. ........... | 348/371 |
| 6,195,127 B1 * | 2/2001 | Sugimoto .................. | 348/370 |
| 6,278,490 B1 * | 8/2001 | Fukuda et al. ............. | 348/362 |
| 6,546,203 B2 * | 4/2003 | Hofer ........................ | 396/155 |
| 7,098,946 B1 * | 8/2006 | Koseki et al. ........... | 348/229.1 |

* cited by examiner

*Primary Examiner*—David Ometz
*Assistant Examiner*—Wanda Negrón
(74) *Attorney, Agent, or Firm*—Gerald T. Bodner

(57) ABSTRACT

A camera includes a CPU. In a case that a continuously photographing mode is set by a mode key, the CPU, in response to a full-depression of a shutter button, performs photographing without flashing a strobe light and a strobe light-emitting photographing in this order or in a reverse order, and each of image files is recorded into a memory card, for example.

2 Claims, 3 Drawing Sheets

CAMERA WITH STROBE LIGHT

BACKGROUND OF THE INVENTION

1. Field of the Invention

The present invention relates to a camera. More specifically, the present invention relates to a camera provided with a strobe light.

2. Description of the Prior Art

In such the kind of a camera, it is possible to obtain a good object image by a photographing that accompanies a strobe light-emitting even in a situation without a sufficient brightness of an object in an indoor place, and etc. The strobe light-emitting photographing is still effective when a primary object sinks in darkness by a backlight.

However, in such a situation as the backlight, and etc, it may be wondered which is more appropriate, a strobe light-emitting photographing or photographing without flashing a strobe light. Herein, in a case of performing the strobe light-emitting photographing despite a fact that the primary object is sufficiently bright, an excessive exposure occurs. On the other hand, in a case of performing photographing without flashing a strobe light despite a fact that the brightness of the primary object is not sufficient, an insufficient exposure occurs.

SUMMARY OF THE INVENTION

Therefore, it is a primary advantage of the present invention to provide a novel camera.

It is another advantage of the present invention to provide a camera capable of photographing an object in a good condition even in a situation where it is wondered whether to use a strobe light.

According to a preferred embodiment, an electronic camera, comprises: an imaging device having an imaging surface onto which an optical image of an object scene is irradiated; an exposing controller for subjecting the imaging surface to a plurality of exposure processes m response to an operation of a shutter button; a driver for flashing a strobe light corresponding to any one of the plurality of exposure processes; and a recorder for recording to a record medium a plurality of object scene images respectively generated by the plurality of exposure processes on the imaging surface.

According to another preferred embodiment, a processing method of an electronic camera having an imaging surface onto which an optical image of an object scene is irradiated, comprises the steps of: (a) subjecting the imaging surface to a plurality of exposure processes in response to an operation of a shutter button; (b) flashing a strobe light corresponding to anyone of the plurality of exposure processes; and (c) recording to a record medium a plurality of object scene images respectively generated by the plurality of exposure processes on the imaging surface.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
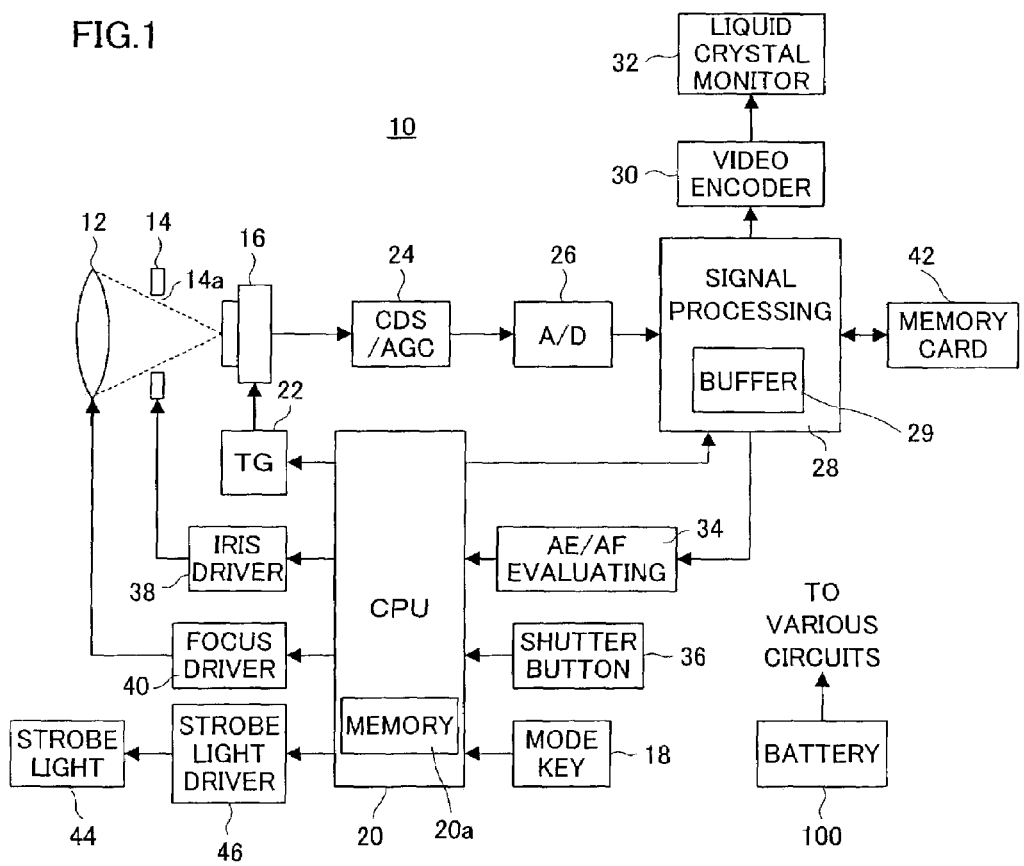
FIG. 1 is a block diagram showing schematic structure of one embodiment of the present invention.

Referring to FIG. 1, a digital camera 10 of this embodiment is driven using a battery 100 as a power source, and has an image sensor 16 of a CCD (Charge Coupled Device) type upon which an optical image of an object is incident via a focus lens 12, and an aperture 14a of an aperture mechanism 14.

When a photographing mode for photographing the object is selected by operating a mode key 18, a CPU 20 instructs a TG (Timing Generator) 22 to repeatedly perform a pre-exposure and a thinning-out reading-out. The TG 22 supplies a timing signal corresponding to the instruction to the image sensor 16, and according to the supplied timing signal, the image sensor 16 exposes the optical image of the object, and outputs one portion of an electric charge accumulated by the exposure in a subsequent one frame period. That is, during an initial phase of the photographing mode to be selected, a raw image signal of a low-resolution is output from the image sensor 16 at every one frame period.

The raw image signal of each frame output from the image sensor 16 is input into a CDS (Correlated Double Sampling)/AGC (Automatic Gain Control) circuit 24, and after a correlated double sampling process and a gain control process are herein applied thereto, input into a A/D conversion circuit 26. The A/D conversion circuit 26 converts the input raw image signal into raw image data, which is a digital signal, and inputs converted raw image data into a signal processing circuit 28.

The signal processing circuit 28 includes a buffer 29, and subjects the input raw image data to a series of processings such as a color separation, a white balance adjustment, a gamma correction, a YUV conversion, and etc. by taking advantage of the buffer 29, and inputs YUV data generated by these processings into a video encoder 30. The video encoder 30 converts the input YUV data into a composite image signal of an NTSC format, and inputs a converted composite image signal into a liquid crystal monitor 32. This allows a real time moving image (through image) of the object to be displayed on a screen of the liquid crystal monitor 32.

Furthermore, Y data out of the YUV data generated by the signal processing circuit 28 is input into an AE (Automatic Exposure)/AF (Autofocus) evaluating circuit 34. The AE/AF evaluating circuit 34 calculates, based on the input Y data, a luminance evaluating value Ey representing a luminance of an object image, and a focus evaluating value Ef representing a level of a focus of the focus lens 12 relative to the object image.

Figure 2:
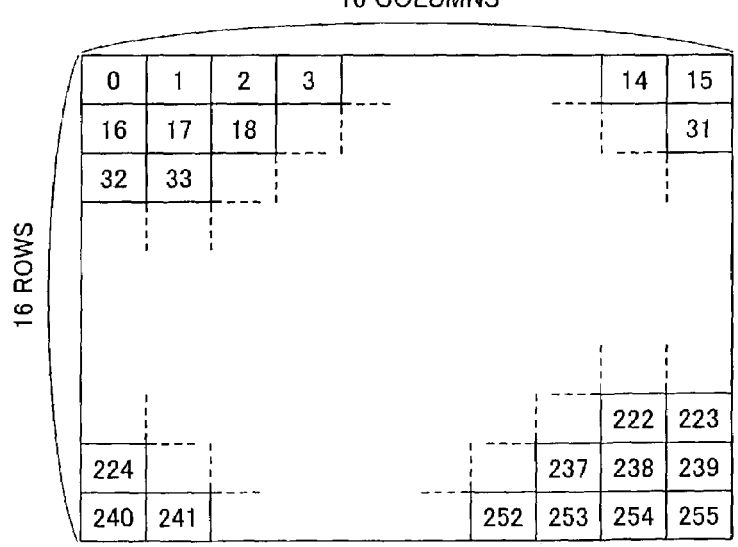
FIG. 2 is an illustrative view showing structure of a screen in FIG. 1 embodiment.

More specifically, the AE/AF evaluating circuit 34 divides an object field (monitor screen) into 256 blocks of 16 rows×16 columns as shown in FIG. 2. Furthermore, regarding each frame, the luminance evaluating value Ey of each block is calculated by integrating the Y data by each relevant block, and the focus evaluating value Ef is calculated by integrating a high-frequency component of the Y data within a predetermined block (several blocks located at a center of the object field, for example) constituting a focus area (not shown).

If a shutter button 36 is half-depressed, the CPU 20 fetches the luminance evaluating value Ey and the focus evaluating value Ef from the AE/AF evaluating circuit 34.

Then, an optimum exposure time and an optimum aperture value are calculated based on the fetched luminance evaluating value Ey, and in addition to setting the calculated optimum exposure time to the TG 22, an aperture driver 38 is controlled in such a manner as to render an aperture value of the aperture mechanism 14 the optimum aperture value. Furthermore, the CPU 20 controls a focus driver 40 in such a manner that the focus evaluating value Ef becomes large, and sets the focus lens 12 to a focal position.

Then, if the shutter button 36 is full-depressed, the CPU 20 enters a recording process. That is, the CPU 20, in addition to instructing the TG 22 to perform one frame of a primary exposure, and read out all pixels, instructs the signal processing circuit 28 to carry out a compression process. The TG 22 supplies to the image sensor 16 the timing signal corresponding to the instruction from the CPU 20. This allows the primary exposure to be executed in accordance with the optimum exposure time. All electric charges accumulated by the primary exposure, that is, one frame of a high-resolution raw image signal is output from the image sensor 16. The raw image signal is input into the signal processing circuit 28 via the CDS/AGC circuit 24 and A/D conversion circuit 26, and converted into the YUV data as a result of a series of the above-described processings. Furthermore, the signal processing circuit 28 subjects the compression process in accordance with a JPEG (Joint Photographic Expert Group) system to the YUV data in response to a compression instruction from the CPU 20, and records a JPEG image file generated by the compression process into a memory card 42.

Incidentally, the digital camera 10 of this embodiment is provided with a strobe light 44. In a case that a forced light-emitting mode that forcedly causes the strobe light 44 to emit a light is set by operating the mode key 18, for example, the CPU 20 enters the recording process that accompanies a light-emitting of the strobe light 44 in response to the full-depression of the shutter button 36. That is, the CPU 20 instructs the TG 22 to perform one frame of the primary exposure, and read out all the pixels. In addition, the CPU instructs the signal processing circuit 28 to perform the compression process, and furthermore, supplies a trigger signal to a strobe light driver 46, thereby causing the strobe light 44 to emit the light in synchronous with the primary exposure of the image sensor 16. This allows the JPEG image file of the object generated by the strobe light-emitting photograph to be recorded into the memory card 42.

On the other hand, in a case of the forced non light-emitting mode that forcedly renders the strobe light 44 not to emit a light is set, the CPU 20 does not supply the above-described trigger signal to the strobe light driver 46. Consequently, in this case, photographing without flashing the strobe light that does not accompany the light-emitting of the strobe light 44 is performed in response to the full-depression of the shutter button 36. This allows the JPEG image file of the object generated by photographing without flashing the strobe light to be recorded into the memory card 42.

In addition, in a case that an automatically light-emitting mode that the strobe light 44 is automatically caused to flash or not to flash in accordance with a brightness of the object image or is set, the CPU 20 calculates the brightness of the object image from the above-described luminance evaluating value Ey. Then, when the calculated brightness does not reach a predetermined brightness, the CPU 20 executes the recording process that accompanies the strobe light 44 in response to the full-depression of the shutter button 36. On the other hand, when the calculated brightness is brighter than the predetermined brightness, the CPU 20 executes the recording process that does not accompany the light-emitting of the strobe light 44.

Furthermore, the digital camera 10 of this embodiment is provided with a special continuously photographing mode, in which photographing without flashing the strobe light is first carried out in response to one full-depression operation (release) of the shutter button 36, and subsequently, the strobe light-emitting photographing is carried out.

In a case that the continuously photographing mode is set by operating the mode key 18, the CPU 20, in response to the full-depression of the shutter button 36, firstly executes the recording process that does not accompany the light-emitting of the strobe light 44, thereby allowing photographing without flashing the strobe light to be performed. This results in the JPEG image file of the object generated by photographing without flashing the strobe light being recorded into the memory card 42.

Upon completion of photographing without flashing the strobe light, next, the CPU 20 executes the recording process that accompanies the light-emitting of the strobe light 44, thereby allowing the strobe light-emitting photographing to be performed, and as a result, the JPEG image file of the object generated by the strobe light-emitting photographing is recorded into the memory card 42. This completes a series of the photographing processes by the continuously photographing mode.

However, in the continuously photographing mode, in a situation where it is apparently possible to photograph the object in a good condition without flashing the strobe light 44, in other words, in a situation where it is apparent that if photographed by flashing the strobe light 44, an excessive exposure surely occurs, the strobe light-emitting photographing is not performed. More specifically, when a luminance evaluating value Eymin of the block having the lowest luminance (luminance evaluating value Ey) out of each block shown in above-described FIG. 2 is greater than a predetermined threshold value α (Eymin>α), the CPU 20 executes only the recording process that does not accompany the light-emitting of the strobe light 44. That is, the CPU 20 completes a series of the photographing processes of the continuously photographing mode without executing the recording process that accompanies the light-emitting of the strobe light 44. On the other hand, when the luminance evaluating value Eymin is equal to or smaller than the threshold value α (Eymin≦α), the CPU 20, after executing the recording process that does not accompany the light-emitting of the strobe light 44 as described above, executes, without interruption, the recording process that accompanies the light-emitting of the strobe light 44, and completes a series of the photographing processes by the continuously photographing mode.

Figure 3:
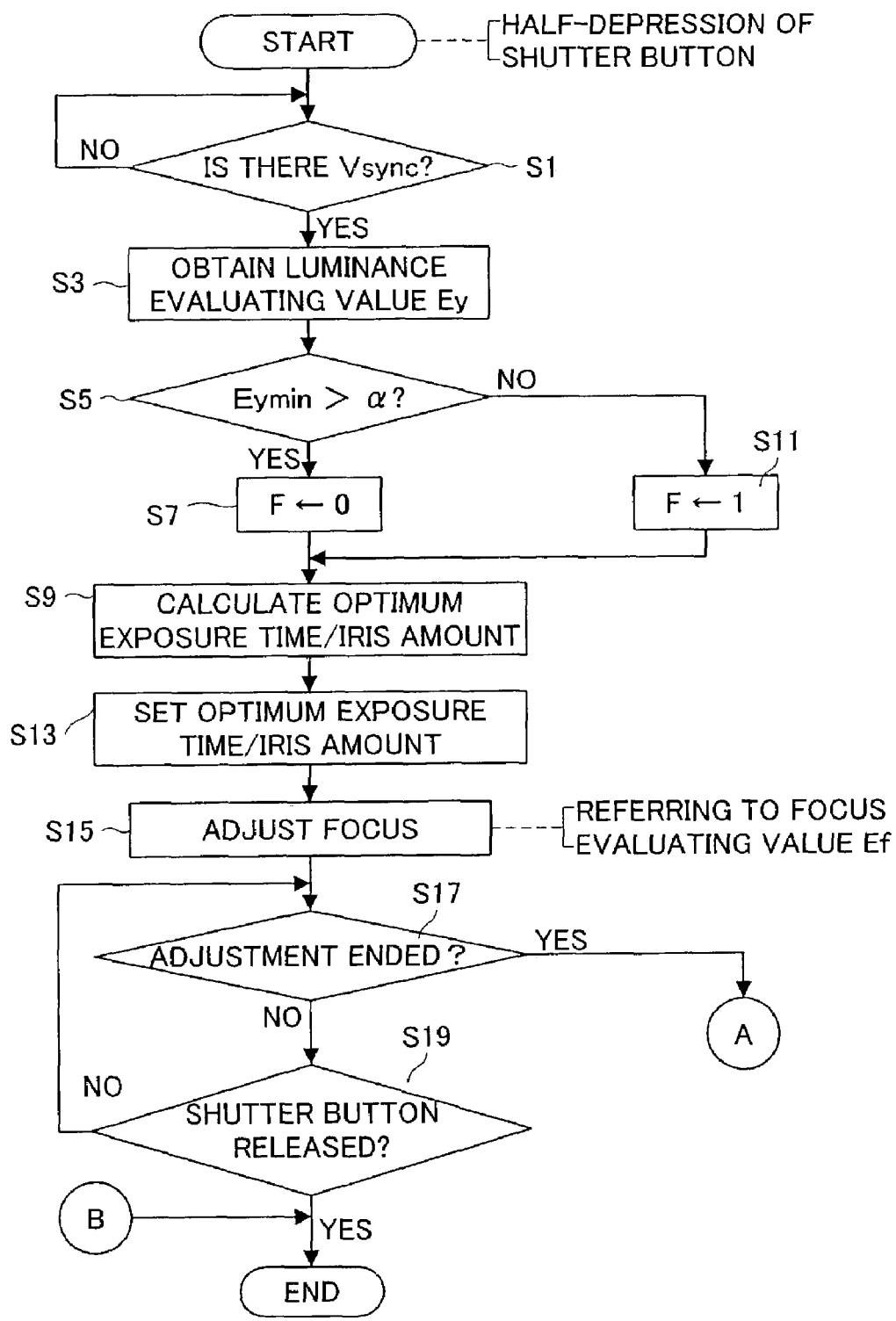
FIG. 3 is a flowchart showing an operation of a CPU in FIG. 1 embodiment.
Figure 4:
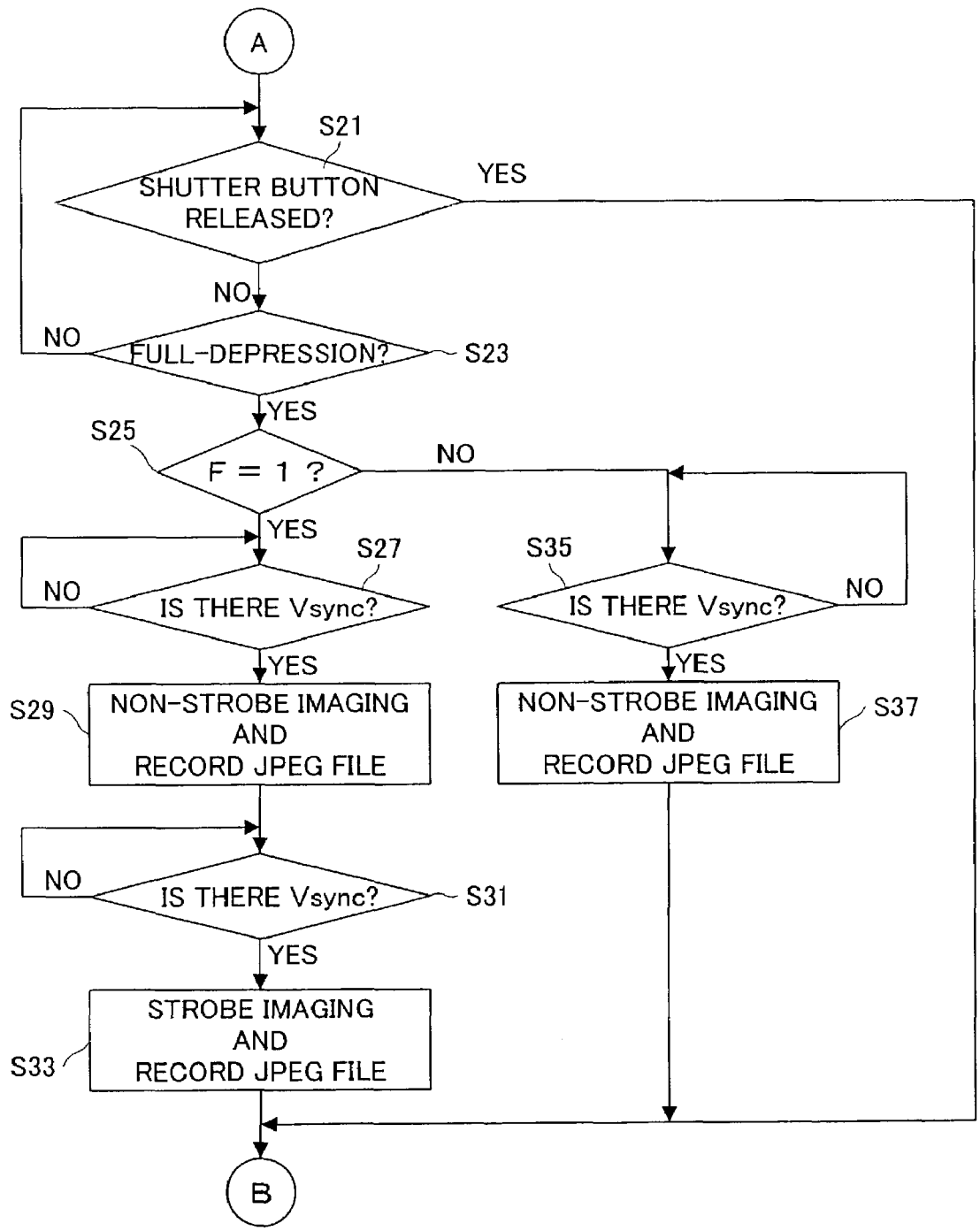
FIG. 4 is a flowchart showing subsequent to FIG. 3.

In the relevant continuously photographing mode, the CPU 20 operates in accordance with procedures shown in flowcharts in FIG. 3 and FIG. 4. It is noted that a control program for controlling an operation of the CPU 20 in accordance with the flowcharts is stored in the program memory 20 within the CPU 20.

Referring to FIG. 3, if the shutter button 36 is half-depressed, the CPU 20 advances to a step S1, and waits for a vertical synchronizing signal Vsync to be input. Herein, if the vertical synchronizing signal Vsync is input, the CPU 20 advances to a step S3, and obtains the luminance evaluating value Ey from the AE/AF evaluating circuit 34 before advancing to a step S5.

In the step S5, the CPU 20 compares the minimum value Eymin of the luminance evaluating value Ey obtained in the above-described step S3 with the threshold value α. Herein, if the luminance evaluating value Eymin is greater than the threshold value α, the CPU 20 advances to a step S7 so as to set a flag F, which is for instructing whether or not to perform the strobe light-emitting photographing, to "0" before advancing to a step S9. On the other hand, if the luminance evaluating value Eymin is smaller than the threshold value α, the CPU 20 advances from the step S5 to a step S11 so as to set the flag to "1" before advancing to the step S9.

In the step S9, the CPU 20 calculates the optimum exposure time and the optimum aperture value based on the luminance evaluating value Ey obtained in the above-described step S3. Then, the CPU 20 advances to a step S13 so as to set the calculated optimum exposure time to the TG 22, and control the aperture driver 38 in such a manner that the aperture value of the aperture mechanism 14 becomes the optimum aperture value.

Upon completion of the process in the step S13, the CPU 20 advances to a step S15 so as to perform a focus adjustment. That is, the CPU 20 obtains the focus evaluating value Ef from the AE/AF evaluating circuit 34 so as to control the focus driver 40 in such a manner that the obtained focus evaluating value Ef becomes large. Then, the CPU 20 determines whether or not the focus adjustment is ended in a step S17. That is, the CPU 20 determines whether or not the focus lens 12 is set to the focal position, and in a case of determining that the focus adjustment is not yet ended, the process advances to a step S19.

In the step S19, the CPU 20 determines whether or not the operation of the shutter button 36 is cancelled, more specifically, whether or not a finger of an operator is released from the shutter button 36. Herein, if it is determined that the operation of the shutter button 36 is cancelled, the CPU 20 ends (suspends) the process shown in this flowchart. That is, in a case that the finger of the operator is released from the shutter button 36 before the focus adjustment is ended, the photographing is not performed.

In a case that the operation of the shutter button 36 is not cancelled in the step S19, the CPU 20 returns to the step S17. Then, if it is determined that the focus adjustment is ended in the step S17, the CPU 20 advances to a step S21 in FIG. 4.

In the step S21, the CPU 20 also determines whether or not the operation of the shutter button 36 is cancelled as in the above-described step S19. Herein, in a case that the shutter button 36 is cancelled, the CPU 20 ends (interrupts) the process shown in the flowchart. That is, in a case that the finger of the operator is released from the shutter button 30 with the shutter button 36 being half-depressed, the photographing is not performed. On the other hand, in a case that the operation of the shutter button 36 is not cancelled, the CPU 20 advances from the step S21 to a step S23 so as to determine whether or not the shutter button 36 is full-depressed.

The CPU 20 repeats the process of the above-described step S21 until the shutter button 36 is full-depressed, and if it is determined that the shutter button 32 is full-depressed, the process advances from the step S23 to a step S25. In the step S25, the CPU 20 determines whether or not "1" is set to the above-described flag F. Herein, in a case that the "1" is set to the flag F, the CPU 20 advances to a step S27 so as to wait for the vertical synchronizing signal Vsync to be input.

If the vertical synchronizing signal Vsync is input in the step S27, the CPU 20 advances to a step S29 so as to execute the recording process that does not accompany the light-emitting of the strobe light 44. That is, in addition to instructing the TG 22 to perform one frame of the primary exposure and read out all pixels, the CPU 20 instructs the signal processing circuit 28 to perform the compression process. Then, upon completion of the process of the step S29, the CPU 20 advances to a step S31 so as to wait for the vertical synchronizing signal Vsync to be input once again.

If the vertical synchronizing signal Vsync is input in the step S31, the CPU 20 advances to a step S33 so as to execute the recording process that accompanies the light-emitting of the strobe light 44. That is, in addition to instructing the TG 22 to perform one frame of the primary exposure and read out all the pixels, the CPU 20 instructs the signal processing circuit 28 to perform the compression process, and furthermore, supplies the trigger signal to the strobe light driver 46. Then, upon completion of the process of the step S33, the CPU 20 ends a series of the photographing processes by the continuously photographing mode.

On the other hand, in a case that "1" is not set to the flag F in the step S27, that is, in a case that "0" is set to the flag F, the CPU 20 advances to a step S35 so as to wait for the vertical synchronizing signal Vsync to be input. Then, if the vertical synchronizing signal Vsync is input, the CPU 20 advances to a step S37 so as to execute the recording process that does not accompany the light-emitting of the strobe light 44. Then, upon completion of the process of the step S37, the CPU 20 ends a series of the photographing processes by the continuously photographing mode.

As understood from the above-described descriptions, according to the continuously photographing mode of this embodiment, after photographing without flashing the strobe light is performed, the strobe light-emitting photographing is automatically performed subsequent thereto. Therefore, even in a situation where it is wondered to flash the strobe light 44, it is possible to photograph the object in a good condition.

It is noted that in a case that an order of photographing without flashing the strobe light and the strobe light-emitting photographing is reversed, that is, in a case that photographing without flashing the strobe light is performed after the strobe light-emitting photographing, a following inconvenience occurs. That is, if the object is a human, in the strobe light-emitting photographing that is performed first, the human may close his eye due to a glaring of a flash of light of the strobe light 44. This results in a situation in which the human is photographed with this eye closed in the photographing without flashing the strobe light that is later performed, thus not possible to obtain a good photographed image. In addition, a nature of the human dictates that he recognizes that an act of the photographing is ended by the flashing of the strobe light 44. Consequently, if the strobe light-emitting photographing is performed first, the human, which is the object, mistakenly recognizes that the act of the photographing is ended by an end of the strobe light-emitting photographing, and as a result, it is probable that the human cancels a photographing pose. Again, it is inconvenient that no good photographing is obtained in the photographing without flashing the strobe light that is later performed. Therefore, as in this embodiment, it is possible to obtain the good photographed image when the strobe light-emitting photographing is performed after photographing without flashing the strobe light.

Furthermore, according to this embodiment, when it is apparent that the excessive exposure occurs in a case that the strobe light-emitting photographing is performed, the strobe light-emitting photographing is not performed, thus possible to prevent an electricity from being wastefully consumed due to a meaningless strobe light-emitting photographing. At the same time, this makes it possible to extend a life of the battery 100 (operating hours of the digital camera 10).

It is noted that when photographing without flashing the strobe light, and the strobe light-emitting photographing are performed by the continuously photographing mode, two sheets of images (JPEG image file) are to be recorded into the memory card 42. However, in the digital camera 10, the operator can arbitrarily delete the image recorded in the memory card 42, that is, it is possible to retain only his own favorite image in the memory card 42 so that the number of sheets of images to be stored in the memory card 42 is not restricted by the use of the continuously photographing mode.

In this embodiment, a case of applying the present invention to the digital camera 10 is described. However, it may be possible to apply the present invention to a film-operated optical camera. It is noted that in the film-operated optical camera, since it is not possible to delete the image photographed on a film, an amount of the film to be consumed is increased by the use of the continuously photographing mode. In this respect, the present invention is highly effective to the digital camera 10 having a characteristic of capable of arbitrarily deleting the photographed image.

Furthermore, in this embodiment, it is determined whether or not to perform the strobe light-emitting photographing after photographing without flashing the strobe light based on the luminance evaluating value Eymin of the block having the lowest luminance. However, it is not always the case. The determination may be made based on an average value of the luminance evaluating value Ey of each block, the luminance evaluating value Ey weighted on a center portion of the screen (weighted), and etc., for example. In addition, the threshold value α, which serves as a determination reference may, be arbitrarily set by the operator.

It is noted that in the above-described automatically light-emitting mode, the determination of whether or not to flash the strobe light 44 is made based on a brightness of a whole object image. Contrary thereto, in the continuously photographing mode, the determination of whether or not to perform the strobe light-emitting photographing is made based on the luminance evaluating value Eymin of the block having the lowest luminance as described above. Therefore, viewed from the brightness of the whole object image, in many cases, the determination reference at a time of determining whether or not to flash the strobe light 44 in the continuously photographing mode becomes higher than the determination reference at a time of determining whether or not to flash the strobe light 44 in the automatically light-emitting mode. That is, in the automatically light-emitting mode, even in a situation where the strobe light 44 is not flashed, there may be a case that the strobe light-emitting photographing is performed in the continuously photographing mode.

Furthermore, photographing without flashing the strobe light performed prior to the strobe light-emitting photographing may be continuously-photographable. That is, after a plurality of sheets of photographings without flashing the strobe light are performed, one sheet of the strobe light-emitting photographing may be performed. In addition, after a plurality of sheets of photographings without flashing the strobe light by an automatic exposure bracketing (AEB) function, the strobe light-emitting photographing may be performed.

Then, in order to set the optimum exposure period, and the optimum aperture value suitable for the strobe light-emitting photographing or for a red-eye reduction, a pre-light-emitting, which flashes the strobe light 44 prior to the strobe light-emitting photographing, may be performed.

In addition, the strobe light 44 may be an incorporated-type that is incorporated with a chassis of the digital camera 10 or an externally-attached-type (external strobe light).

Furthermore, in the continuously photographing mode, when it is apparently possible to photograph the object in a good condition even without flashing the strobe light 44 (that is, when the luminance evaluating value Eymin exceeds the threshold value a), the strobe light-emitting photographing is not to be performed, this is not always the case. That is, after photographing without flashing the strobe light is performed, the strobe light-emitting photographing may forcedly be performed irrespective of the brightness of the object image. Then, whether or not the strobe light-emitting photographing is forcedly performed may be arbitrarily selected by the operation of the mode key 18.

Moreover, although in the continuously photographing mode, after the JPEG image file generated by the strobe light-emitting photographing is recorded in the memory card 42, the strobe light-emitting photographing is to be performed. However, this is not always the case. The photographing without flashing the strobe light, and the strobe light-emitting photographing are performed all at once, for example, and two sheets of the image files generated by these photographings are temporarily stored in a buffer 29 provided in the signal processing circuit 28 in FIG. 1, for example, and upon completion of the photographing, each of the image files may be transferred from the buffer 29 to the memory card for a recording.

In addition, the present invention is, under a certain condition, to execute photographing without flashing the strobe light and the strobe light-emitting photographing at least once each time in response to one release operation. However, the order of the photographing is not limited to the order described in this embodiment, that is, the order that the strobe light-emitting photographing is performed after photographing without flashing the strobe light. Contrary to that, photographing without flashing the strobe light may be performed after the strobe light-emitting photographing.

Furthermore, as an external recording medium, an arbitrary storing or recording medium may be used other than the medium called "memory card" shown in the embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imaging device having an imaging surface onto which an optical image of an object scene is irradiated;

an exposing controller for subjecting said imaging surface to a plurality of exposure processes in response to a first operation of a shutter button;

a driver for flashing a strobe light corresponding to the last exposure process out of said plurality of exposure processes carried out by said exposing controller; and a recorder for recording to a record medium a plurality of object scene images respectively generated by said plurality of exposure processes carried out by said exposing controller on said imaging surface.

2. A processing method of an electronic camera having an imaging surface onto which an optical image of an object scene is irradiated, comprising the steps of:

(a) subjecting said imaging surface to a plurality of exposure processes in response to a first operation of a shutter button;

(b) flashing a strobe light corresponding to the last exposure process out of said plurality of exposure processes carried out by said step (a); and (c) recording to a record medium a plurality of object scene images respectively generated by said plurality of exposure processes carried out by said step (a) on said imaging surface.

* * * * *